Aug. 13, 1957 W. E. CAREY 2,802,290

TAPE INDEX

Filed Dec. 20, 1954

INVENTOR.
Walter E. Carey

BY George W. Crowley

ATTORNEY

United States Patent Office 2,802,290

Patented Aug. 13, 1957

2,802,290

TAPE INDEX

Walter E. Carey, Boston, Mass.

Application December 20, 1954, Serial No. 476,342

2 Claims. (Cl. 40—2)

This invention relates in general to tape recorders and in particular to an index device for use with tape recorders.

Tape recorders are becoming more popular each year because of their convenience and relatively small size, their simplicity and the ease of storing records. Because conventional reels of tape hold sufficient tape for several selections, it is possible to store a great many records in a small space. This means, however, that picking out the desired selection on a reel of tape is somewhat difficult. There is no distinction in the outward appearance of the tape between one selection and another. Hence, the operator of the recorder finds it necessary to start and stop the machine, listening to a little of the recorded material until, by this method of picking and choosing, he succeeds in stopping the tape at the point of the desired selection. Even though rewinding at high speed is possible, this process of finding a desired selection is a nuisance and detracts from the convenience offered by the machine.

One method of overcoming this problem has been used on some types of machines. It consists merely of a counter geared to the reel which must be set at zero when the supply reel is fully wound. As selections are recorded on the tape, the counter turns and it is then necessary to write the name of the selection plus the number of turns read from the counter at the position on the tape where recording begins. The usual practice is then to include with each reel of tape the piece of paper carrying the number of turns and the selections on each side of the tape. This method is not too satisfactory because a piece of paper easily gets lost or separated from its appropriate reel.

Furthermore, the provision of a counter geared to the reel is an expensive means for keeping recording data. Finally, the nuisance of zeroing the counter on a full or empty reel, checking numbers on the counter, and then writing them down is objectionable to most people.

Therefore, it is an object of the present invention to provide a simple, inexpensive device for indexing the recordings on a reel of tape.

It is a further object to provide a device which can conveniently be included with each reel of tape.

It is a still further object of the present invention to provide an index device which is suitable for advertising or other purposes, as well as providing a useful function.

It is another object to provide a reliable index device for tape recorders which may carry data on recordings on both sides of a reel of tape.

In general, the present invention consists in a length of cardboard, or light plastic, or other suitable material providing a surface for printing or writing. In one form, the strip or length of material includes a circular opening or a V opening for engaging the axle of a reel on a tape recorder. The strip extends out radially over the reel and is provided with a flat surface on which may be written the selections being indexed by title, and lines may be pencilled or marked in a tangential direction to the edge of the tape not yet unwound from the reel. For a better understanding of the invention, together with other and further objects, features, and advantages, reference should be made to the following description which is to be read in connection with the accompanying drawings in which:

Figure 1:
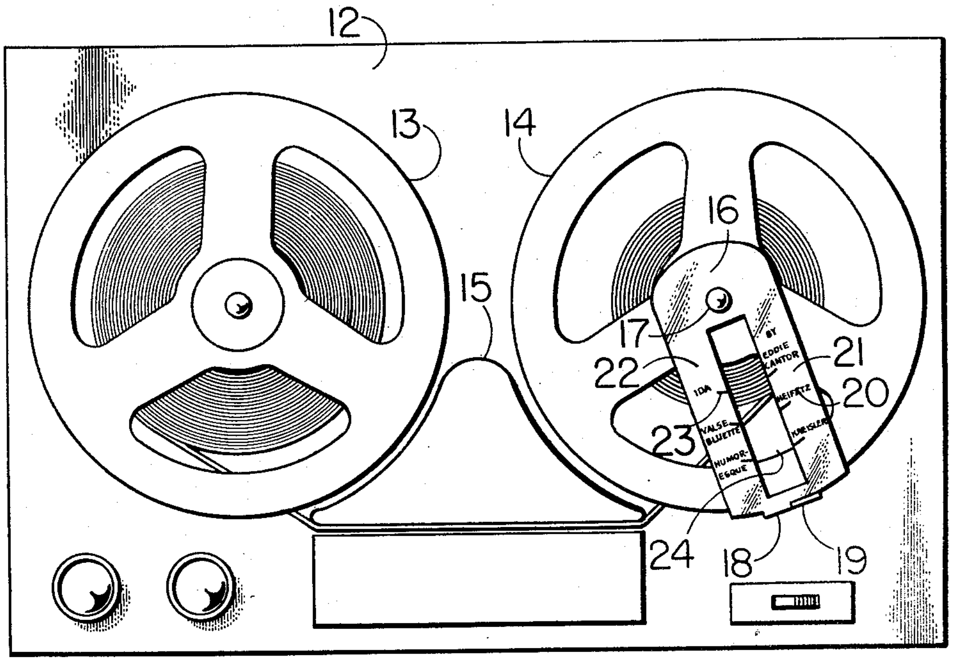
Fig. 1 is a top view of a tape recorder incorporating an embodiment of the present invention.

Referring particularly to Fig. 1, there is shown a tape recorder 12 having reels 13 and 14. In this illustration it is to be assumed that reel 14 is the supply reel and reel 13 is the takeup reel, although this is of no importance to the proper operation of the present invention. The recording and playing head of the machine is disposed beneath shield 15 and tape passes through the head from reel 14 to reel 13 in the manner indicated.

Detachably disposed upon the upper surface of reel 14 is a plastic strip 16 of sufficient stiffness to remain substantially flat and parallel to the upper surface. An opening 17 is provided in strip 16 to permit it to be slipped over the hub of reel 14. At the end of strip 16 remote from opening 17 two tabs 18 and 19 are provided. Tab 19 is bent upwardly and tab 18 is bent downwardly from strip 16. In the position shown in the present view, tab 18 engages the rim of reel 14 and the distance from opening 17 to tab 18 is made such that strip 16 engages reel 14 lightly for purposes which will be apparent from the description of operation hereinbelow.

The central portion 24 of strip 16 may advantageously be cut out or made transparent. Side areas 21 and 22 may be clouded or opaque, and in these areas the names of selections recorded on the tape may be written. At the uper end of strip 16 adjacent opening 17, there is an area which may conveniently be utilized for advertising or other marking. Lines such as at 23 may be drawn on side areas 21 or 22 at the beginning or end of a selection recorded on the tape. In some instances, it has proven desirable to provide grooves along the side areas 21 and 22 to better accommodate marking lines.

The strip 16 is made reversible. Thus, when reel 14 is turned over to play or record selections, strip 16 is also turned over and presents the same type of surface and convenient indexing method that is shown in the drawing. Each of tabs 18 and 19 serves the dual purpose of retaining the strip 16 in place and providing a finger hold when the reel 14 is turning. On many recorders, tab 19 would be in light contact with the portion of the tape entering the reel, which would eliminate the need of holding the strip in position with the finger tab, since the tape would prevent strip rotation.

Thus, in operation, strip 16 is placed on reel 14 with opening 17 fitted over the hub of reel 14. The tab 18 engages the rim of reel 14 lightly. The reel is caused to rotate by tape being pulled from it by reel 13 and the operator of the recorder watches the tape as it comes from reel 14. By looking through opening (or transparent area) 24, the operator is enabled to see when the line of remaining tape coincides with a line marked on opaque area 21 or 22. The operator may then turn the instrument on and the desired selection will be heard.

Of course, when it is desired to make recordings rather than replay them, a similar operation is performed. The operator merely records the music starting at a point on reel 14 opposite which he makes a mark on opaque area 21 or 22. If desired, another mark is made opposite the amount of tape remaining on the reel at the conclusion of the selection. As the marks are made, proper identification is placed on areas 21 and 22 adjacent central portion 24 for each selection so recorded.

Another area of usefulness of the present invention is in editing selections either as they are being recorded, or after they have been recorded. Many times, as material is being recorded from a radio or television broadcast, undesirable items will crop up, such as advertising, static or the like. Similarly, when phonograph music is being taped, scratched or cracked records give rise to objectionable noise which might desirably be eliminated.

This is accomplished by rewinding the tape to the start of the undesirable matter, which has been noted on the tape index device. New selections are then superimposed over that length of tape, or, it may be more convenient to cut that length from the tape and splice the remainder.

The index device of the present invention greatly simplifies this operation over that possible with a geared counter. Attention is not diverted from the tape by an attempt to read a fast-moving counter to compare it with a previously written number and a quicker more accurate job of editing is assured.

Figure 2:
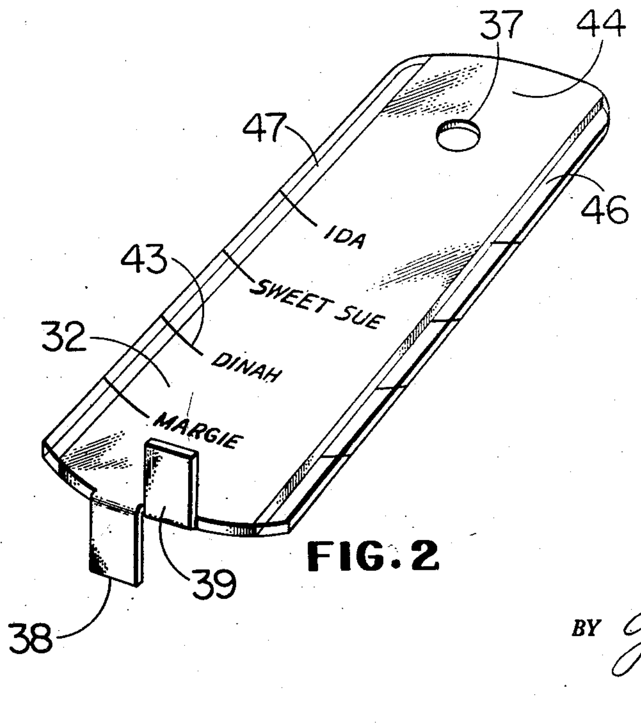
Fig. 2 is a perspective view of another embodiment of the index device of the present invention.

Referring now to Fig. 2, there is shown an alternative embodiment of the present invention wherein a strip, again of cardboard or plastic, is formed for placement against a reel. Strip 32 has tabs 38 and 39 formed at the end thereof in a manner similar to tabs 18 and 19 of the embodiment of Fig. 1. A central opaque or clouded area 44 which may be rectangular or otherwise shaped is formed centrally of strip 32 and is available to receive notations identifying the recorded material. Side areas 46 and 47 are shown as transparent to provide for better viewing of the remaining tape on the reel and for marking lines such as 43. These areas need not be transparent, but may be opaque in the simple case, lines being drawn to the extreme edges as shown.

A circular opening such as 37 may be used to engage the hub of the reel or, if desired, a semi-circular opening at the end of the strip is sufficient. Tabs 38 and 39 are of sufficient length to extend only as far as the thickness of the reel to prevent their interfering with proper operation of the recording instrument, but provide adequate area for the operator to forestall movement of the strip 32. A suitable area for advertising or the like is left at the top or hub end of area 44 adjacent opening 37.

Figure 3:
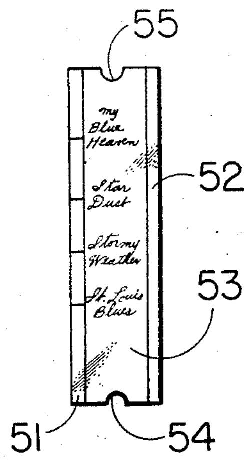
Fig. 3 is a perspective view of another embodiment of a tape index device.

Referring now to Fig. 3, there is disclosed an alternative embodiment of the indexing memo of the present invention. In this instance, a simple strip of cardboard or plastic 53 is provided. Side areas 51 and 52 are available for marking and central area of strip 53 provides space for titles or other material. Semi-circular opening 55 is provided to engage the hub of the reel of the recording machine. Another semi-circular opening 54 is provided at the opposite end of strip 53. This embodiment of the invention is particularly useful in those machines which have a post acting as a tape guide adjacent the periphery of the reel. Opening 54 then engages the post and is held in fixed relationship to the reel. In the simplest case, it is not necessary in this embodiment that side areas 51 and 52 differ in any way from the central area of strip 53. It is recognized, however, that it may at some times be desirable to provide transparent side areas at 51 and 52.

Although what has been described constitutes preferred embodiments of the present invention, it is believed that the concept of providing a strip for use with each reel of tape in a recording machine and capable of receiving markings to index selections on the tape is novel. Numerous possible modifications will suggest themselves to those skilled in the art and the invention should be limited only by the spirit and scope of the appended claims.

What is claimed is:

1. An index for use with a tape recorder having a first supply reel containing a length of tape and a second take-up reel for drawing said tape from said supply reel and through a recording head comprising, a length of material, opposite surfaces of said length of material having areas for receiving markings, oppositely directed tabs at one end of said length of material, said tabs being substantially perpendicular to said length of material, and means at the other end of said length of material for engaging the hub of said take-up reel, whereby said length of material may be detachably disposed in contact with the upper surface of said take-up reel with the downwardly directed tab on said length of material in contact with tape entering said reel and markings may be placed on said opposite surfaces of said length of material in register with tape remaining coiled on said take-up reel.

2. An index for use with a tape recorder having a first supply reel containing a length of tape and a second take-up reel for drawing said tape from said supply reel and through a recording head comprising, a strip of cardboard, said strip having flat opposite surfaces for receiving markings, a portion of one end of said strip being turned upwardly to form a first tab substantially perpendicular to said strip of material, another portion of said one end adjacent said first portion being turned downwardly to form a second tab substantially perpendicular to said strip of material, and an aperture formed at the other end of said strip of material for engaging the hub of said take-up reel, whereby said strip of material may be detachably disposed in contact with the upper surface of said take-up reel with the downwardly directed tab on said strip of material being held against motion with said take-up reel by said downwardly directed tab engaging tape entering said reel, said strip of material being held in a position radial of said take-up reel and said surface being so disposed that markings may be placed on said surface in register with a point tangent to the outer dimension of tape remaining on said take-up reel.

References Cited in the file of this patent

UNITED STATES PATENTS

| | | |
|---|---|---|
| 1,475,958 | Marsh et al. | Dec. 4, 1923 |
| 1,489,147 | Padget | Apr. 1, 1924 |
| 1,564,964 | Knieling | Dec. 8, 1925 |
| 1,688,824 | Miessner | Oct. 23, 1928 |
| 1,776,470 | Jones | Sept. 23, 1930 |
| 1,804,453 | Basseches | May 12, 1931 |
| 1,867,997 | Baruch | July 19, 1932 |
| 2,202,925 | Schoch | June 4, 1940 |
| 2,316,815 | Sears | Apr. 20, 1943 |
| 2,563,350 | McCombie | Aug. 7, 1951 |

FOREIGN PATENTS

| | | |
|---|---|---|
| 364,022 | Great Britain | June 16, 1931 |
| 971,596 | France | Aug. 2, 1950 |